(No Model.) 2 Sheets—Sheet 2.
R. POTTER.
GLASS MELTING FURNACE.
No. 304,955. Patented Sept. 9, 1884.
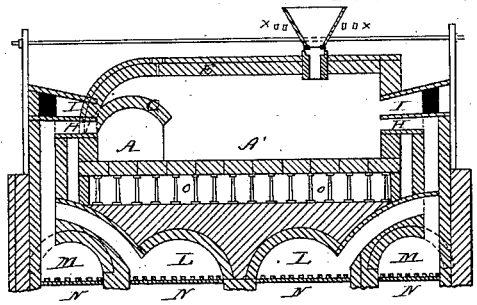
Fig. 3
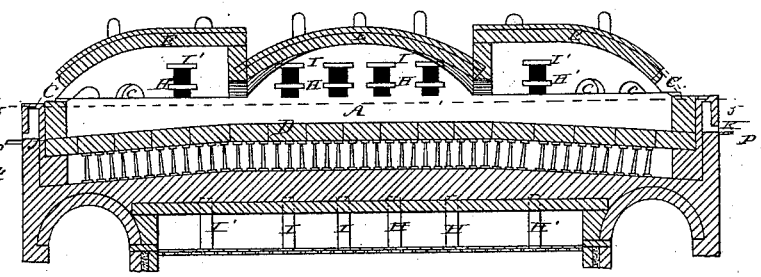
Fig. 4
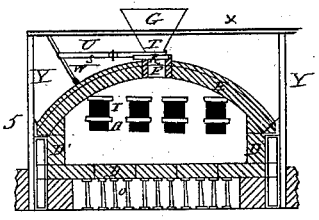
Fig. 5
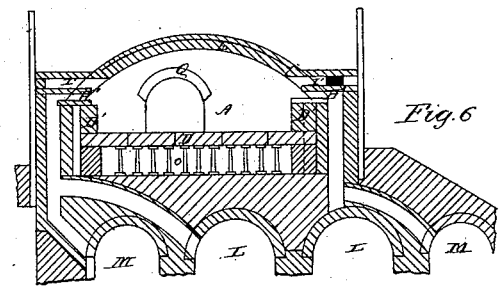
Fig. 6
Fig. 7  Fig. 8
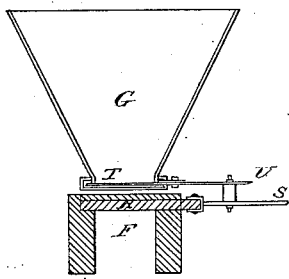
Fig. 9
WITNESSES:
Wm H. Powell.
A. A. Connolly.
Richard Potter
INVENTOR
by Connolly Bros
ATTORNEYS

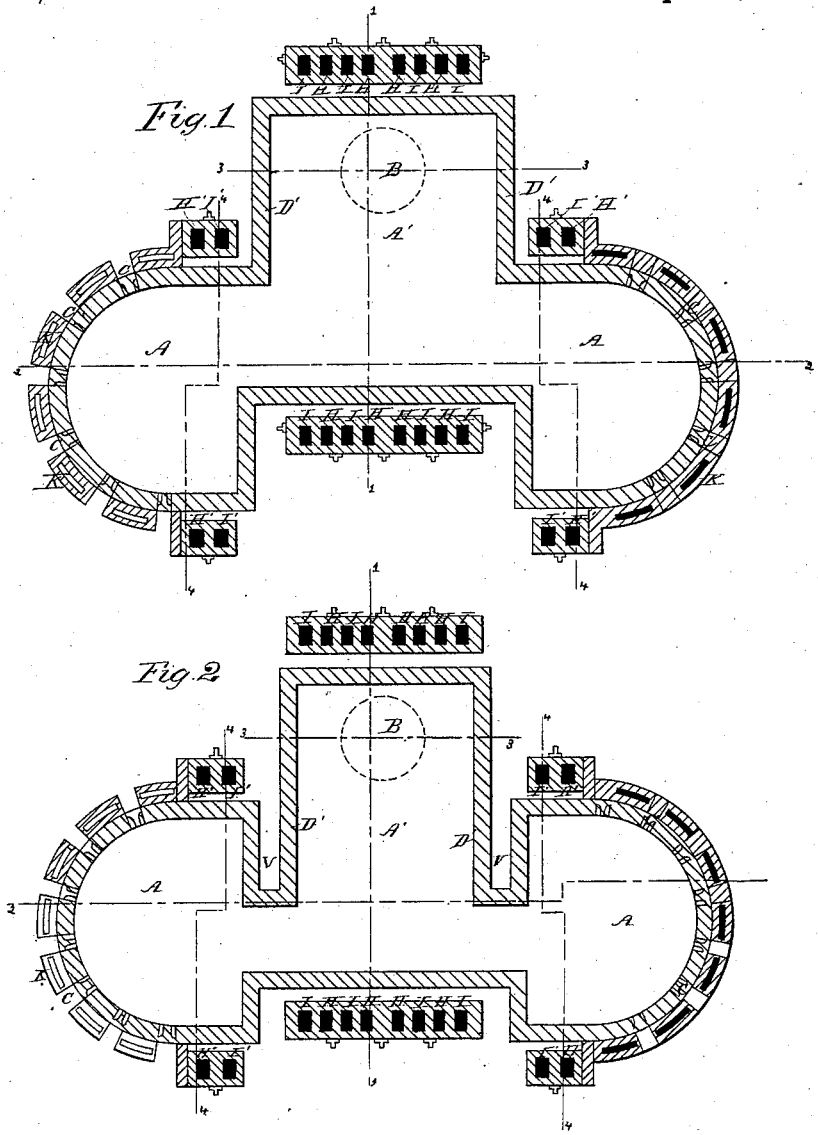

UNITED STATES PATENT OFFICE.

RICHARD POTTER, OF DEARNE TERRACE, STAIRFOOT, COUNTY OF YORK, ENGLAND.

GLASS-MELTING FURNACE.

SPECIFICATION forming part of Letters Patent No. 304,955, dated September 9, 1884.

Application filed October 3, 1883. (No model.) Patented in England June 22, 1882, No. 2,971.

*To all whom it may concern:*

Be it known that I, RICHARD POTTER, of Dearne Terrace, Stairfoot, in the county of York, England, have invented certain new and useful Improvements in Glass-Melting Furnaces, of which the following is a full, clear, and exact description.

This invention relates to a new arrangement of a regenerative gas-tank furnace and mode of charging the same; also, to a new mode of supporting and keeping cool the bottom of the tank. Hitherto furnaces for melting glass in a continuous manner have either been constructed with two or more compartments, such compartments being separated from each other by transverse partitions or bridges constructed so as to allow passages for the molten glass to pass from one compartment to the other, or such furnaces have been constructed without bridges or partitions, and have had the charging hole or holes at one end of the tank just over the side quarries, and the working-out holes in similar position at other end of tank; or the charging-holes have been at center of each side of the tank, just over the side quarries, and the working-out holes in similar position at both ends of the tank. The first-named plan of furnace with bridges or partitions has the drawback that the said bridges or partitions wear away very rapidly, thus entailing serious cost and loss of time in repairs. The second-named plan of furnace is liable to objection, owing to the fact that often, when the batch or raw material is being charged or filled on, many of the small particles spread over the surface of the fine metal, thereby rendering it unworkable. The improvements which, according to my invention, I make consist in the following arrangements:
In carrying out my invention I construct one large tank for melting and working-out purposes of a T shape—that is, having in the center an offshoot or wing—and so that, while being all in one, it contains three separate sets of gas and air port holes or flues, so arranged that the most intense heat can be secured in the center of tank or melting portion, while at each end or working-out portion of the tank the heat is not so intense. In the center or melting-out portion I construct double the number of gas and air port holes or flues, and I also pack the regenerator-chambers with the small fire-bricks commonly used for that purpose in such a manner that these bricks are the densest at each end, and are the most open in the center of regenerator-chamber, thus allowing the greater body of combustible gases to pass in at center or melting portion of furnace. The ordinary mode of charging over the sides of tank allows some of the batch or raw material to adhere to the parts of the tank sides nearest to the charging-holes, and the chemicals contained in the batch quickly act upon the portions to which they adhere, thus causing them to wear away much more rapidly than the other portion of sides of the tank. By the present mode of charging or filling on of the raw material there is also much time taken up, during which the furnace is losing heat. According to my present invention I form in the center of the crown or arch covering the melting portion of tank a suitable hole. Above this hole I fix a hopper sufficiently large to hold the required quantity of batch or raw material for one charging. This hopper is fitted at the bottom with a slide operated by a lever or other suitable arrangement, and when it is required to introduce the raw material into the furnace I simultaneously draw off the covering from the hole in furnace crown or arch and draw out the slide at bottom of hopper, thus allowing the batch or raw material to drop immediately into the center of melting-compartment, and thus the fused batch or molten metal already in the tank is forced against the sides of the tank, and direct contact between the chemicals in the raw batch and the sides of the tank is thus avoided. The charging-hole being through center of crown or arch, and the material being carried up into the hopper by any suitable mechanical means—such as elevators—the labor of charging the furnace is considerably lessened, while the time taken up in charging is reduced, and the risk of choking up the gas and air ports or passages with the small particles of batch is materially lessened. According to my invention I also construct the tank in such a way that it is deeper toward the working-out end or ends than it is in the part or portion for melting, and thus the molten glass passes more easily toward the working-holes, while the unrefined is left to the action of the intense heat in the melting portion.

My invention also relates to an improved method of supporting the blocks which form the bottom of the tank. For this purpose I employ small cast-iron pillars so arranged as to support the blocks not only at the corners where they join each other, but also in the center of the blocks. By substituting iron pillars for the brick pillars generally used, and also by arranging these iron pillars so as to properly support each block throughout, I avoid the risk of the tank leaking, and by giving more air-space for cold air under the tank the bottom is made to wear longer.

In the drawings, Figures 1 and 2 are sectional plans on line 5, Fig. 4, of tank-furnace constructed according to my invention. Fig. 3 is a transverse section on lines 1, Figs. 1 and 2. Fig. 4 is a longitudinal section on lines 2, Figs. 1 and 2. Fig. 5 is a longitudinal section on lines 3, portion $a$, Figs. 1 and 2. Fig. 6 is a transverse section on lines 4, Figs. 1 and 2. Figs. 7 and 8 are sections showing shadow or outside brick-work J of furnace, with the flue K therein, commencing above floor-level P, for admitting cold air. Fig. 9 is an enlarged section of hopper G, Figs. 3 and 5, showing the levers or handles S and U and the slide T and cover R. The hopper may be fixed or portable, as will be well understood, and may rest on the iron supports X, secured to upright girders Y.

The same parts are indicated by the same letters or numbers throughout the drawings.

A is tank or furnace, having wing or offshoot A', which offshoot has the gas ports or flues H H and the air ports or flues I I at each side. Under these flues or ports are the regenerator-chambers M M for the gas and L L for the air, having the zigzag brick-work N N, piled so that this brick-work is more open in the center of the chambers M M and L L than through the flues or ports H H into wing portion A' of tank-furnace, and securing the most intense heat there. The zigzag brickwork under the ports or flues H' H' and I' I' at each side of the semicircular ends is packed more densely, so that the combustible gases cannot pass through these ports or flues so rapidly, thus allowing the two semicircular ends to be sufficiently cool for continuous working.

D D are the fire-brick blocks forming bottom of tank, and D' D' are similar blocks forming sides of tank. These may be of any required number or size.

C C are the working-out holes at each end of tank, which may be of any suitable number.

E E are arches of fire-brick, forming crown of furnace.

F is a hole formed in crown E over portion A' of tank, as shown, Figs. 3 and 5, over which is passed or fixed the hopper G, into which the raw material or batch to be melted is fed, and then let down by pulling away the cover R by means of the handle S, at same time drawing out slide T from bottom of hopper by means of handle U. The handles S and U are attached to lever W, as shown, by means of which the cover R and the slide T can be withdrawn simultaneously.

Referring to Figs. 1 and 2, the dotted circle B shows the part of wing A' into which the raw material will fall when it drops through hole F, Figs. 3 and 5. Thus (assuming that the tank has first been filled or partially filled with "cullet" or broken glass) this molten glass already in the tank is forced against the blocks D' D', forming sides of tank. The raw material or batch to be thus charged into the furnace may be either elevated into the hopper by means of ordinary elevators, or I arrange the floor of the mixing-shed so that it is on a level with the top of furnace-crown, and run the raw material in small trucks along a suitable tramway and upset the trucks into the hopper; or the hopper may be constructed to run in wheels along the tramway from the furnace to the mixing-hole, and be there refilled with batch, ready for next charging. This latter plan I prefer to adopt. I claim for this portion of my invention, first, great saving in the labor required for charging the raw material into the tank; second, the great reduction in the time required for charging, and therefore great reduction in loss of heat to the furnace; third, prevention of the rapid wearing away of the sides D' of tank by avoiding the chemicals coming in contact therewith.

Referring to my improved arrangement for bottom of tank, Fig. 4 shows the bottom sloped according to my invention, whereby the tank is deeper at the working-out ends, and thus the molten and refined glass flows more readily to these working-out ends. It may be stepped instead of sloped, if so preferred, or made lower next working-holes, in any other suitable manner.

Referring to my improved arrangement for supporting the blocks D, which form the bottom of the tank, I use for this purpose small cast-iron pillars $o$, which are arranged as shown, Figs. 3, 4, 5, and 6, so that two pillars support the center on each side of the block and two pillars support each end of the block; but all these pillars are arranged about four inches from where the blocks join each other, (to form the bottom,) and thus a constant supply of cold air is kept along all the joints of the bottom, while at same time the middle of block is well supported, thus avoiding risk of the block cracking in middle, and securing a constant supply of cool air along the joints.

Referring to Fig. 2, this shows a slight modification of shape of tank, whereby the recesses V V are formed as shown, thus allowing a better support for arches E of the tank-crown, and the arch $q$, Fig. 3, supports portion of the crown, as shown, Figs. 3 and 4.

It will be clearly understood that the wing A' may be any other preferred shape, and also that where it is desired to work a smaller tank than the one I have shown this may be done, if so preferred, by only having one working-out end instead of two, also having the wing portion A' proportionally smaller.

I claim—

1. In a regenerative gas-furnace for melting glass, the combination, with a working-chamber constructed substantially as described, of a lateral offshoot or wing constituting the melting-tank and adapted to receive the charge, as set forth.

2. In a glass-melting furnace having the melting-chamber located in a wing or offshoot, the working-chambers A A, having floors inclined or sloping from the rear end of the said melting-chamber to the working-out ends of said melting-chambers.

The foregoing specification of my improvements in furnaces for melting glass signed by me this 5th day of June, 1883.

RICHARD POTTER.

Witnesses:
 MILTON BROOKE,
  *Stead Lane, Hoyland Common, Barnsley.*
 AARON BOSTWICK,
  *Silkstone Common, Barnsley.*